United States Patent [19]
Rogers et al.

[11] Patent Number: 5,656,561
[45] Date of Patent: *Aug. 12, 1997

[54] PRESSURELESS SINTERING OF WHISKER REINFORCED ALUMINA COMPOSITES

[75] Inventors: William M. Rogers, Taylors; James F. Rhodes, Greer, both of S.C.

[73] Assignee: Advanced Composite Materials Corporation, Greer, S.C.

[*] Notice: The term of this patent shall not extend beyond the expiration date of Pat. No. 5,389,586.

[21] Appl. No.: 50,176

[22] PCT Filed: Dec. 3, 1992

[86] PCT No.: PCT/US92/11379

§ 371 Date: Nov. 24, 1993

§ 102(e) Date: Nov. 24, 1993

[87] PCT Pub. No.: WO93/11086

PCT Pub. Date: Jun. 10, 1993

Related U.S. Application Data

[63] Continuation-in-part of Ser. No. 922,763, Jul. 31, 1992, abandoned, and a continuation-in-part of Ser. No. 801,854, Dec. 3, 1991, abandoned.

[51] Int. Cl.$^6$ ............................................. C04B 35/76
[52] U.S. Cl. ............... 501/87; 501/89; 501/95.3; 501/96.1; 501/97.2; 501/98.4; 264/640; 264/676; 264/119; 264/120
[58] Field of Search ...................... 501/87, 89, 95, 501/96, 97; 264/65

[56] References Cited

U.S. PATENT DOCUMENTS

| | | | |
|---|---|---|---|
| 4,745,091 | 5/1988 | Landingham | 501/95 |
| 5,389,586 | 2/1995 | Rogers et al. | 501/95 |

FOREIGN PATENT DOCUMENTS

86/05480  9/1986  WIPO.

*Primary Examiner*—Paul Marcantoni
*Attorney, Agent, or Firm*—Banner & Witcoff, Ltd.

[57] ABSTRACT

A composite and pressureless sintering process for making whisker-reinforced alumina composites using about 1 to about 7.5 wt. % of a nitride modifier consisting essentially of silicon nitride, aluminum nitride, or mixtures thereof that produces a sintered body having a density of greater than 95% theoretical.

30 Claims, 1 Drawing Sheet

Effect of $Si_3N_4$ Additions on Fracture Toughness

● Pressureless Sintered
△ Sintered/HIP
☐ Hot Pressed

Effect of Si$_3$N$_4$ Additions on Fracture Toughness

● Pressureless Sintered
△ Sintered/HIP
□ Hot Pressed

PRESSURELESS SINTERING OF WHISKER REINFORCED ALUMINA COMPOSITES

This application is a continuation-in-part of application Ser. No. 07/922,763, filed on Jul. 31, 1992, abandoned, and a continuation-in-part of application of Ser. No. 07/801,854, filed on Dec. 3, 1991, abandoned.

FIELD OF THE INVENTION

The invention relates to a pressureless sintering process for forming whisker-reinforced alumina-based ceramic bodies having excellent physical properties.

BACKGROUND OF THE TECHNOLOGY

Whisker-reinforced alumina has found use in structural applications such as heat engines and turbine blades (see, U.S. Pat. No. 4,543,345) and in more severe applications such as cutting tools (see, U.S. Patent Nos. 4,789,277 and 4,961,757). These composites can have up to about 40 vol. % whiskers using a processing technique known as "hot pressing" which produces composites having a density of at least greater than 98% of theoretical. A density of at least about 95% is needed for virtually all engineering applications of ceramics.

In the conventional processes for making whisker-reinforced alumina bodies, hot pressing can also be described as "pressurized sintering" because the process involves the application of uniaxial loads of about 3500-5500 psi. In the process, a powder blend or preformed sample is loaded in a free flowing form into a graphite die and sintered under an inert atmosphere in a high temperature furnace. Pressure is applied to the powder in the die with a hydraulic ram as the furnace temperature is increased to about 1450°–1850° C. and maintained at temperature for an appropriate time. The furnace is then allowed cool. Cycle times of several hours are used, and the process is limited to the production of discrete batches.

The structural limits of the dies generally prohibit the use of applied pressures greater than about 5500 psi. In addition, the hot pressing method generally limits the shape of the formed body to simple geometric shapes such as round or rectangular plates or cylinders unless special complex dies and pressure rams are constructed at great expense. In addition, the properties of such hot pressed bodies are more anisotropic due to the uniaxial loading than those prepared by the pressureless sintering.

Hot pressing is to be contrasted with "green" preform body preparation, "pressureless sintering" and "hot isostatic pressing" (HIPing). Green preform bodies are prepared by mixing ceramic powder blends with conventional sintering aids (e.g., magnesia and/or rare earth oxides) and an organic binder containing a lubricant. The green preform body is then formed by compacting the powder blend at ambient temperature to a density of about 60–70% of theoretical. The theoretical density of a material is the density calculated from the number of atoms per unit cell and the measurement of the lattice parameters. Generally, green bodies are formed as simple geometrical shapes (e.g., a tube, cylinder, or disk) and, if necessary, machined to the desired shape allowing for shrinkage which will occur during subsequent heating steps (i.e., near-net-shape fabrication). Binder material is removed by heating the shaped green body in air in an oven at temperatures up to 500° C. for about 10–15 hours depending on size and shape.

A green preform body is further densified by pressureless sintering in a furnace at 1450°–1850° C. under an atmosphere (e.g., argon or nitrogen) that does not adversely affect either the composite being sintered or the sintering furnace components. The sintering is allowed to continue until essentially complete (generally greater than 94% to 95% theoretical density). If the resulting sintered body forms a closed cell structure (closed porosity), the density may be further increased by hot isostatic pressing.

Hot isostatic pressing (HIPing) is the process of applying high pressure to a sintered body with inert gas typically at 15,000–30,000 psi for about 1–2 hours at a temperature of from about 1500° to about 1700° C. (for alumina oxide) with the goal of producing a body having greater than about 98% theoretical density. The sintered body to be HIPed must exhibit almost completely closed cell structure. More than about 95% of the pores must be closed for HIPing to have a significant effect.

The concentration of closed pore structure is calculated from the formula:

$$(\% \ Closed) = 100 - (\% \ Theoretical \ density) - (\% \ Open \ Porosity)$$

The method used for measuring the closed porosity is ASTM C830-83. Briefly described, the open pore structure is determined by measuring water uptake during vacuum impregnation of the body. As an example, if a dry sintered body with a density of 95% theoretical density has a water uptake corresponding to 1% of the alumina composite density, then the body has a 4% closed pore structure. The theoretical density is calculated by applying the rule of mixtures to the absolute densities of each component, as is well known in the art.

Economically, hot pressing is an extremely expensive and labor intensive process. The pressing equipment is costly. The graphite dies must be cut from a unitary block and do not last for many pressings. The cycle times are relatively short, but can only produce a limited number of specimens. The pressed bodies are limited to simple geometric shapes. The machining of such shapes to final form is difficult due to the high density and hardness of the body and can lead to rejects or surface stresses that affect the structural performance of the part. See, Sacks U.S. Pat. No. 5,009,822.

By contrast, pressureless sintering is about 25–33% the cost of hot pressing. Conducting the process at about atmospheric pressure reduces the capital expense of equipment needed for the process. Continuous processing can be used, and large numbers of parts can be made. If a batch process is used, the batches are larger and the furnaces can be used more economically. Metal dies used for green forming can be reused for many pieces. The ability to readily machine the green body permits the formation of complex shapes. If needed, HIPing can be used after pressureless sintering to increase the final density of the body at a total cost that is still less than the corresponding hot pressing process (i.e., perhaps 30% less) but without the inherent limits imposed by hot pressing.

Pressureless sintering would, therefore, be a preferred method for making ceramic bodies and for whisker reinforced ceramics in particular. Unfortunately, those in the art have found that pressureless sintering does not produce adequate densities when the composite contains more than 10 vol. % (about 8.1 wt %) whiskers. See, Tiegs U.S. Pat. No. 4,652,413 where an alumina matrix containing 2% yttria as a sintering aid and 10 vol % silicon carbide whiskers was sintered by pressureless sintering to greater than 94% theoretical, but an equivalent sample with 20 vol % (about 16.7 wt. %) whiskers could achieve only 75% theoretical density. This limitation of about 10 vol % whiskers is also described in Sacks U.S. Pat. No. 5,009,822 in col 7, lines 4–12. Somewhat similarly, WO 86/05480 exemplified sintered densities of greater than about 95% theoretical only for composites containing up to about 12.1 volume % (10 wt %) whiskers (Table I).

A review of the problems associated with pressureless sintering of alumina-SiC whisker composites is presented in Tiegs et al., *A. Ceram. Sec. Bull.*, 66(2) 339–342 (1977). As described on page 340, the whiskers interfere with efficient particle packing, particle rearrangement, and shrinkage. The result is a low final density. Table II and FIG. 2 in Tiegs show that as the whisker content increases, the green and final densities decrease. Tiegs et al. states: "At whisker contents much greater than 10 vol %, the inhibition of densification is acute." Moreover, HIPing was not able to increase the density of the body because "the material had not achieved closed porosity prior to HIPing." The fracture toughness for the 20 vol % whisker material was reported by Tiegs as not significantly higher than monolithic alumina.

In a later paper, Tiegs et al. achieved a 95% density with pressureless sintering of an alumina composite containing about 13 vol % (about 10.7 wt %) whiskers. *Ceram Engr. and Sci. Proc.*, Sept.–Oct. 1986, pp. 1182–1186, FIG. 2. The paper also summarizes the need in the art: "Further development may make it possible to sinter and then HIP (without encapsulation) alumina with up to 20 vol. % SiC whiskers, but that is yet to be shown."

The art has gone to great lengths to find a process that would produce a whisker-reinforced alumina composite with a density of at least about 94% to 95% theoretical. Techniques used to increase density include dry processing of powders with pressureless sintering and HIPing (see, Tiegs et al., *Ceram. Engr. and Sci. Proc.*, 13th Automotive Conf., pp. 1182–1186 (Sept.–Oct. 1986)) and wet processing with size classification to remove agglomerates followed by slip and centrifugal casting of well dispersed suspensions of alumina and whiskers (see, Sacks et at., *J. Am. Ceram. Soc.*, 71(5) 370–379 (1988)). These wet processing methods are considered to produce superior green bodies compared to dry powder processing. See, Sacks et al. in Table III. Wet processing techniques can be used to produce green bodies having high densities with even 30 vol % whiskers because green body density is not significantly affected by whisker size and concentration. Compare Sacks et at., *J. Am. Ceram. Soc.*, 71(5) 370–379 (1988) with Tiegs et al., *Ceram Engr. and Sci. Proc.*, (Sept.–Oct. 1986) in FIG. 2. Upon sintering, however, the whiskers exert a controlling influence over the densities which can be attained by sintering green bodies made by either dry or wet processing.

The need continues to exist for a pressureless sintering process that will permit the use of high levels of whiskers as reinforcing agents for alumina matrices and result in a sufficiently high density with a sufficient degree of pore closure to permit HIPing the body to further increase both the density and strength of the ceramic to the level required by the intended application.

One skilled in the art will recognize that the application and purpose for which the reinforced ceramic is to be used will dictate the minimum density and strength that is required. Different applications and end uses will require different minimum densities and strengths. For example, a metal cutting tool insert with 15 wt. % whiskers requires a density of greater than 98% theoretical. A router bit of the same composition, designed for cutting non-metals such as wood, requires a density of greater than 96.5% theoretical. Thus, depending on the composition of the ceramic, its application, and end use, HIPing after pressureless sintering may or may not be required. The identification of the requirements for each use is within the skill of the art.

The art has also suggested the use of high levels, e.g. greater than 8 wt %, of sintering aids to increase the composite density. The resulting liquid phase may, however, affect the composite's high temperature properties. Sacks et at., *Ceram. Engr. Soc. Proc.*, 9 [7–8], pp. 741–754 (1988). It would be desirable to have a process that could produce high densities without the need for high levels of sintering aids which adversely affect properties of the composite.

In addition to a high density and closed pores, the final composite should exhibit high levels of toughness. One method for increasing the toughness of a reinforced alumina composite is described in Landingham U.S. Pat. No. 4,745,091. The disclosed method includes hot pressing an alumina composite containing reinforcing particles, magnesia (as a sintering aid), zirconia or hafnia (for toughness and shock resistance), and 0.1–15 wt % of a nitride modifier. Reaction hot pressing is preferred to avoid the need for a preliminary step to pre-react the powders so as to form a second nitride phase (identified as "SiAlOX") uniformly dispersed in the matrix. See, col 3, lines 6–9; col. 4, lines 30–38; and FIG. 3. If the powders are pre-reacted, the patent discloses that cold pressing and sintering can be used. The examples illustrate the use of a total nitride modifier concentration of 9–30 wt % with hot pressing fabrication. The problem of achieving high compaction densities with high whisker concentrations is not disclosed, acknowledged, nor exemplified.

It would be desirable to provide a pressureless sintering process that could produce whisker-reinforced alumina composites exhibiting levels of toughness comparable in use to those of reinforced alumina composites made by hot pressing.

SUMMARY OF THE INVENTION

It is an object of the invention to provide a process for preparing whisker reinforced alumina composites by pressureless sintering whereby the sintered body exhibits a high density and sufficient closed pores to permit the body to be HIPed to a density of at least about 98% theoretical.

It is another object of the invention to provide a process for preparing whisker reinforced alumina composites by pressureless sintering whereby the sintered body exhibits a toughness comparable in practical use to those of reinforced alumina composites made by hot pressing.

These and other objects that will become apparent from the description herein.

In one aspect, the invention contemplates a process which comprises:

sintering at ambient pressures a preform body having a density within the range from about 60% to about 70% theoretical and made from a mixture comprising a matrix material consisting essentially of alumina and up to about 4% of sintering aids, from about 10 to about 25 wt % monocrystalline whiskers, and from about 2 to about 7.5 wt % of nitride modifier consisting essentially of silicon nitride or aluminum nitride or mixtures thereof, to provide a sintered ceramic composite which exhibits a density of at least about 94% or 95% of theoretical and a sufficiently high density and concentration of closed pores that will permit the body to attain a density of at least about 98% theoretical upon hot isostatic pressing.

In other aspects, the invention contemplates composites and articles made therefrom including cutting tools, can-making tools, and other tools requiring high levels of wear resistance. The composite and tools are made by the pressureless sintering processes described herein.

The present invention provides a process for consistently producing dense, tough ceramic composites using a significantly less expensive procedure than the conventional hot pressing process. The practice of the invention allows for ready control of the composition and properties of the final product. The process is not only economical but provides a product having good performance.

Without wishing to be bound by any particular theory, it appears that the presence of homogeneously distributed fine particles of nitride facilitates the formation of a transient, irreversible liquid phase during the pressureless sintering step. Such liquid phase aids the formation of closed pores which enhances the beneficial effect of later HIPing. The properties of ceramics from the present process are comparable in practical use to made by hot pressing.

DETAILED DESCRIPTION

Figure 1:
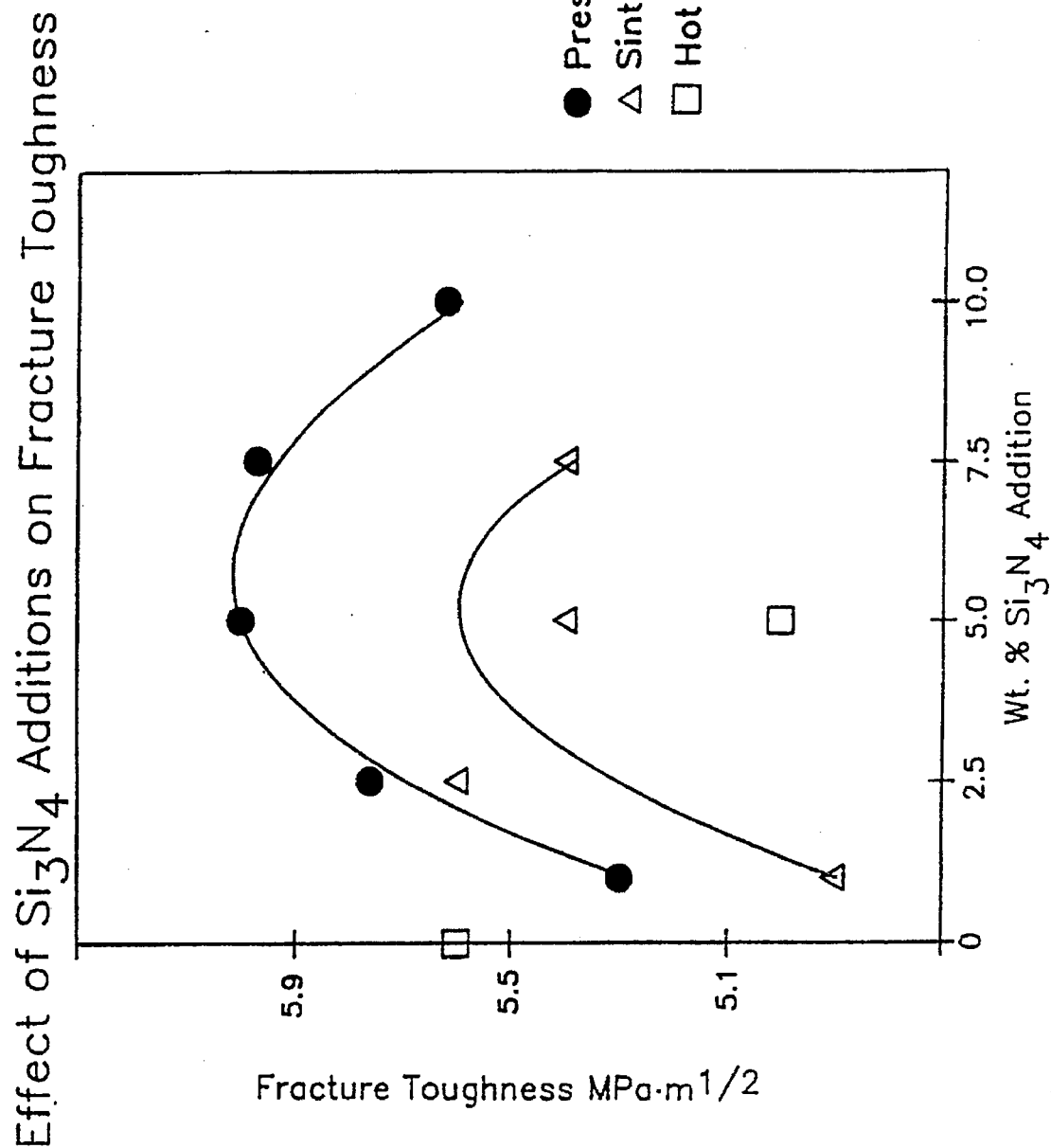
FIG. 1 is a graph depicting the relationships between fracture toughness and silicon nitride content in an alumina matrix reinforced with silicon carbide whiskers. The fracture toughness of two hot pressed composites is provided for comparison.

Alumina useful for the matrix material of the present invention is α-alumina having a high degree of purity. Preferably, the powdered alumina used in the process has an average particle size from about 0.5 μm to about 1 μm and represents at least about 60% of the total weight of the final composite. The matrix may also contain a sintering aid and any conventional toughening agents.

The matrix nitride modifier for the present invention consists essentially of powdered, fiber, or whisker forms of silicon nitride, aluminum nitride, or mixtures thereof. The preferred nitride modifier consists essentially of silicon nitride. The average particle size range for the nitride modifier or modifiers when used in powered form is within the same ranges as those for the alumina, preferably about 0.5 μm to about 1 μm.

The total nitride modifier content should lie within a range from about 1 wt % to about 7.5 wt % based on the total composite weight, preferably from about 2 to about 7.5 wt %. More preferably, the total nitride modifier is added in a concentration with a range of about 3.5 to about 6 wt %, and most preferably a nitride modifier content of about 4 to about 5.5 wt % when 15 wt % whiskers is used. The optimum nitride modified concentration for a particular whisker concentration is readily determined by one in this art with the exercise of no more than the existing skill, level from the teachings herein.

Sintering aids for the matrix of the present invention are known in the art and are used in concentrations of up to about 4 wt. %, preferably only up to about 2 wt %. A sintering aid acts to increase the efficiency of the sintering process without materially affecting the reinforcing effects of the whiskers in the matrix. Preferred sintering aids include at least one sintering aid of, inter alia, magnesia, yttria, and other rare earth oxides. Nitride modifiers such as silicon nitride and aluminum nitride according to the present invention are generally not considered to be sintering aids. See, Landingham U.S. Pat. No. 4,745,091 in col. 2, lines 39–68.

The matrix may also contain up to about 25 wt % of toughening and/or hardening agents to affect the overall composite toughness and hardness, respectively. Toughening agents useful in the invention are those oxides generally known in the art and include zirconia and/or hafnia. Hardening agents, such as titanium carbide, can be used in quantities of up to about 10 wt %. The toughening and hardening agents are in the form of particles typically within the size range from about 0.5 to about 1 μm. Titanium carbide particles, however, may be somewhat larger.

Monocrystalline ceramic whiskers are thoroughly distributed throughout the matrix of the invention to act as reinforcement thereof. Monocrystalline ceramic whiskers useful as matrix reinforcement include alumina, titanium carbide, silicon carbide, titanium nitride, aluminum nitride, aluminum oxynitride, and mixtures thereof. Each of these whiskers are well known in the art. Silicon carbide whiskers are the preferred whisker for the present invention and are thoroughly described in U.S. Pat. No. 4,961,757 which is herein incorporated by reference. Briefly described, silicon carbide whiskers are in the beta form of silicon carbide whisker and exhibit a monocrystalline structure. Such whiskers may be produced from rice hulls and have average diameters on the order of 0.6 μm and aspect ratios on the order of 15–150. Strengths are about 1 million psi (70,000 kg/cm$^2$) with tensile modulii of about 60–100 million psi (4–7 million kg/cm$^2$).

Whiskers may be present in mounts within the range from about 10 wt % to about 25 wt %, preferably within the range from about 10 or about 15 to about 23 wt %, and most preferably within a range from about 10 to about 20 wt %. Particularly good results are seen when the composite contains about 10–18 wt % or 10–15 wt % whiskers.

An inert carrier gas like argon, helium, or any of the other noble gases may be used in the purge gas stream passed through the sintering chamber. It has been discovered, however, that hardness and toughness may be improved in the final composite by use of a nitrogenous gas in the purge gas stream which is passed through the sintering chamber during the pressureless sintering process. Nitrogenous gases that can be used in the purge gas include nitrogen and other nitrogen-containing gases like ammonia that will produce nitrogen at sintering temperatures but which does not adversely affect either the composite being sintered or the sintering furnace components.

It has been determined that further improvement in the sintered ceramic composite may be obtained if the purge gas which is passed through the sintering chamber also contains a gaseous hydrocarbon. The hydrocarbon can be added to any of the purge gases suitable for use in this invention. Virtually any hydrocarbon that assumes a gaseous form at sintering temperatures and has an atomic carbon to hydrogen ratio of at least about 0.25, preferably above about 0.5, and most preferably at least about 1, can be used as a getter agent in the purge gas stream for the present invention. At the ceramic sintering temperatures contemplated for the present invention (1500°–1850° C.), most hydrocarbon species introduced with the stream of inert gas into the sintering chamber will crack or dissociate into species reactive toward any reactive impurities issuing from the composite being sintered. A getter should not be used if the reactive form will have sufficient excess hydrogen to favor the formation of water which can have a corrosive effect on the whiskers us well as the components of the sintering furnace. The amount of hydrocarbon present in the purge gas is within the skill of the art but often will be from about 1% to about 10 volume %.

Suitable hydrocarbon agents for use as getter agents in pressureless sintering include linear, branched, and cyclic alkanes (e.g., methane, ethane, propane, butane, isobutane, pentane, hexane, and cyclohexane); linear, branched, and cyclic alkenes (e.g., ethylene, propylene, butylene, butadiene); linear, branched, and cyclic alkynes (e.g., acetylene, propyne, butyne, and pentyne); and mono- or multi-ring aromatic hydrocarbons (e.g., benzene, toluene, and naphthalene). For ease of operation and convenient handling, alkanes having 2–10 carbon atoms and monoaromatic hydrocarbons are preferred.

While not wishing to be bound by any particular theory, it is thought that the hydrocarbon acts, at least in part, as a uniformly distributed getter that act, to remove any surface or localized species, such as oxygen, issuing from the composite or present within the furnace during the sintering process that are reactive to the whiskers dispersed throughout the matrix. The net effect is that the whisker is protected through the sintering process and is better able to reinforce the matrix in the final product. This protection mechanism also helps to understand why hot pressing in a graphite die will produce highly reinforced composites: the solid carbon pressing on the sample is sufficiently close to be able to contact and deactivate reactive species from the composite and the surroundings. Pressureless sintering in a larger graphite chamber will not exhibit the same level of protection because the carbon in the furnace walls is too far away from the composite surface and too localized in its effects to afford a similar protection against reactive species.

Regardless of which specific purge gas or combination of gases is used, the purge gas generally flows through the sintering chamber at a rate within the range from about 0.03 to about 30 gas hourly space velocity (GHSV). Preferably, the purge gas has a space velocity of 1–5 GHSV. Preferably, the purge gas contains a combination of at least 20 volume percent of a nitrogenous gas and about 1–10 volume percent of a hydrocarbon.

Composites made according to the present invention are made by mixing the alumina, whiskers, and nitride modifier with mixing techniques that thoroughly disperse the whiskers in the matrix material. Ball milling with alumina or ceramic balls is a preferred mixing method. One preferred method involves a combination of wet ball milling, drying the wet mixed material to form a cake, and dry ball milling the cake. Binding and willing aids are added to the process where they can best be dispersed to obtain optimum use. For example, wet ball raffling times may range from about 2 to about 24 hours, drying may be at temperatures within the range from about 70° C. to about 120° C., and dry ball milling times may range from about 2 to about 24 hours. The specific process is chosen to provide a homogeneous free flowing agglomerated powder which preferably has an agglomerated particle size distribution substantially within the range from about −40 Tyler mesh (373 μm) to about +325 Tyler mesh (44 μm). Desirably the dry ball milling following wet milling and drying is conducted for a sufficient period so that the composite will lose not more than about 2.5% by weight and more desirably not more than about 2% by weight upon pressureless sintering. An insufficiently dried or pulverized powder can adversely affect the final product. The mount of time for dry ball milling will vary depending on the nature and scale of the equipment and operating parameters. The choice of equipment and operating parameters is within the skill of the art.

A green preform body is made from the thoroughly mixed, unreacted, free-flowing powder after wet milling and dry ball milling by conventional wet or dry forming methods. Conventional organic binders and lubricants are employed in preparing the preform bodies. Suitable methods include axial pressing at ambient temperatures at pressures within the range from about 10,000 to about 30,000 psi (6900–21,000 N/cm$^2$) and preferably about 10,000 to about 20,000 psi (about 6900–14,000 N/cm$^2$), cold isostatic pressing, extrusion with high back pressures, injection molding, and casting with conventional slip or centrifugal techniques (see, e.g., Sacks U.S. Pat. No. 5,009,822).

The preform bodies exhibit a density within the range from about 60% to about 70% of theoretical maximum and are often made in simple geometric shapes such as cylinders, round or square disks, and tubes. If desired, these preform bodies may be machined by conventional techniques into a shape approximating that of the final product dimensions with appropriate allowance for shrinkage upon sintering. Such shapes are sometimes referred to in the art as having a "near net final" shape, It should be noted that, contrary to the teaching in Landingham U.S. Pat. No. 4,745,091, the powders used for the matrix are not pre-reacted or otherwise subjected to chemical reaction processes before being shaped into green preform bodies. Although not wishing to be bound by any particular theory, the nitride modifier of the matrix in levels according to the invention appears to be mitigating the effects which previously inhibited the production of high composite densities with highly loaded whisker composites made by pressureless sintering. See, Lange, *J. Mater. Rsch.,* 2(1) 59–63 (1987) for a discussion of the factors which are thought to inhibit high loading. The matrix nitride modifier of the present invention may be producing a localized irreversible transient plastic or liquid phase during the sintering that permits further rearrangement of whiskers which are otherwise constrained from further movement by frictional forces in the absence of the nitride modifier. It is believed that pre-reaction of a nitride-containing matrix as taught by Landingham '091 forms a solid sialon-type phase during prereaction and would not form a transient liquid later under sintering conditions.

Pressureless sintering according to the invention is conducted on the preform composite bodies at about ambient pressures in a furnace, preferably a graphite furnace, at a temperature within the range from about 1500° to about 1850° C., and for a time sufficient to produce a sintered composite having a density of at least about 95%. A 98–99% theoretical density is generally a maximum density for pressureless sintering processes on whisker-reinforced composite bodies. Those skilled in the art of sintering will recognize that no more than routine optimization will be needed to select the optimum conditions for the specific geometries of the furnace and the shapes of the samples being sintered.

Ambient pressures for use in pressureless sintering include the atmospheric conditions prevailing at the manufacturing site although pressures somewhat above and below ambient pressures may be used if desired. Lower pressures may be used to evacuate the sintering chamber. Slightly elevated pressures (e.g., up to a few atmospheres) may also be used to prevent entry of materials or gases from outside the sintering chamber although such elevated pressures generally provide little, if any, benefit to the sintered product. Generally, the sintering cycle time will be about 12–48 hours although those in this art are aware that sintering cycle temperatures and times may be varied depending on the nature and size of the body being sintered.

The composite resulting from the pressureless sintering process of the invention exhibits a density of at least about 94% or 95% of theoretical density and greater than about 95%, preferably above about 99% in closed pore structures. The closed pore structure content should be sufficient to permit further compaction by HIPing to a density of greater than about 98% theoretical. The factors which affect the sintered density and closed pore structure include the fineness of the powders, the amount of silicon nitride present with respect to whisker content, the degree of dry ball milling, the selection of purge gas (e.g.: nitrogen is beneficial for higher densities and closed pores) sintering rates and sintering temperature. The optimum balance of these factors is within the skill of the art.

Sintered composites according to the invention exhibit a fracture toughness of greater than about 5 MPa$\sqrt{m}$, and a bending strength of greater than about 500 MPa after HIPing to provide the properties suggestive of utility for a number of applications for the composites. Fracture toughness is measured according to G. R. Anstis et al., Gem Am. Ceram. Soc., 64, p. 553 (1981) employing a 10 kg load, and bending strength is measured according to MS 1942B. These sintered composites even before HIPing have utility for applications which may not require very high strength. Such applications include, inter alia, can tools, bearings, routers and drill bits for non-metal and soft metal (e.g., brass) shaping, and the like.

If the sintering process results in a body having a density of less than about 98%, the sintered preform body may be further compacted by hot isostatic pressing (HIPing) for a time sufficient to produce a compacted body having a density of greater than about 98%. It should be noted that the present invention provides a product from pressureless sintering that has a sufficiently high concentration of closed porosity that further densification by hot isostatic pressing can be accomplished without the use of an external cladding or encapsulation material around the part subjected to the hot isostatic pressing.

Any HIPing of the sintered composite body is conducted by employing standard prior art techniques. Such techniques employ an inert gas, often argon, at from about 15,000 to about 30,000 psi at a temperature of about 1500° to about 1700° C. for a time (e.g.: 1–2 hours) sufficient to provide the desired density of at least about 98%.

HIPed composites from the present process are useful for fabrication into a variety of elements subject to wear and/or impact where toughness and shock resistance are important characteristics and which have previously been served by ceramics made by hot pressing. Particular applications for the present HIPed composites include, inter alia, drill bits exhibiting cutting edges for graphite composites, plastics, woods, or metals; router bits exhibiting cutting edges for, inter alia, wood, fiberboard, metal, plastics, or laminated composites including graphite composites and wood laminates; cutting tools exhibiting a cutting edge for cutting metals; turbine blades; heat engine components such as engine blocks, pistons, and valves; punches and dies exhibiting surfaces and clearances appropriate for can manufacture or other metal shaping operations; nozzles; roller or ball bearings that may be formed as assemblies in a metal or ceramic race; extrusion dies; and seals, inter alia, pump seals for impellers.

Drill and router bits made from ceramics using the present process exhibit shapes which are the same as those of conventional drill and router bits. These tools are useful for cutting wood, metals, and laminates such as graphite composites and wood laminates. In fact, use of the present ceramic tools for cutting graphite composites will perform like hot pressed ceramic bits which can cut hundreds of holes in graphite composites without delamination. See, Lauder U.S. Pat. No. 5,002,439.

When used for cutting tools, the cutting tools are replaceable inserts of the standard geometry employed in the cutting tool industry for applications including, inter alia, turning, facing, milling, boring, and similar operations. The inserts will exhibit a cutting edge having dimensions and angles appropriate for cutting metal according to the desired cutting technique. As an example, a preferred insert geometry for cutting nickel-based alloys would exhibit an axial rake of −5°, an end cutting edge angle of 15°, a radial rake of −5° with a radial relief of 5°, and a corner angle of 15° with a nose radius of 0.030 inches (0.762 mm). See, Rhodes U.S. Pat. No. 4,961,757 and 4,789,277 which are herein incorporated by reference. Indeed, use of the process permits inserts and tools to be manufactured to near net final shape without the need for machining larger blanks and the material waste associated therewith.

Can tools made from ceramics produced according to the present process (either before or after HIPing) exhibit a shape of forming wheels, punches and/or dies with smooth outer surfaces and close tolerances between associated dies and punch elements. The whisker reinforced alumina ceramics possess a number of unique advantages in their ability to produce smooth part surfaces for long periods of time without significant buildup of can material on the outer surface of the tool. See, Lauder U.S. Pat. No. 5,095,730.

The ceramic bodies made according to this invention both after pressureless sintering and after HIPing have a substantially random three dimensional orientation of whiskers so that resistance to fracture is substantially the same in all directions. This orientation is in contrast to the two dimensional orientation (perpendicular to the axis of the ram) which is obtained in a hot pressed ceramic product.

EXAMPLES

The following examples are useful for describing the benefits of the present invention. In all examples, the alumina was a commercially available α-alumina powder with a density of 3.98±0.02 g/cm$^2$ with a purity of at least 99.97%. The surface area of the alumina was 10.5 m$^2$/g. The sintering aids were magnesia and yttria in levels of less than 4%.

The silicon nitride powder was a commercially available mixture of alpha (95.2%) and beta (4.8%) forms having a density of about 3.18 g/cm$^2$. The average particle size of the silicon nitride powder was 0.45 μm.

The monocrystalline whiskers used in the examples were silicon carbide whiskers produced from rice hulls. These whiskers before processing have average diameters of about 0.4 to about 0.6 μm and aspect ratios on the order of 15–150. The whiskers had a density of 3.21 g/cm$^3$.

Unless otherwise stated, all percentages are given in terms of weight percent based on total weight and the procedure in examples 1–5 was used to prepare the composites identified in the examples.

EXAMPLES 1–5

Examples 1–5 illustrate the effects of a varied silicon nitride powder concentration on a constant whisker concentration of 15%.

Alumina powder, silicon nitride, silicon carbide whiskers, and the sintering aids (2% or less yttria and 2% or less magnesia) were weighed and wet ball milled for about 10 hours. An organic binder (polyethylene glycol and/or polyvinyl alcohol) and a lubricant (stearic acid) were then added, and ball milling continued for another 30 minutes. The mixture was then placed in an oven and completely dried at about 70° C. The resulting cake was dry milled for about 16 hours until the material became a homogeneous free-flowing powder exhibiting an agglomerated particle size distribution substantially in the range from about −60 Tyler mesh (250 μm) to about +325 Tyler mesh (44 pm) with whiskers uniformly distributed therethrough.

Green preform bodies exhibiting disk shapes were prepared by pressing the powder in a cylindrical die having a diameter of 1.125 inches (28.6 mm) and applying an axial pressure of about 10,000 psi (about 6900 N/cm$^2$). The resulting disks contained 10 grams of compacted powder. The binder material was removed by heating the preform in a muffle furnace at 500° C. in air until all the binder had been burned off. The sample was then ready for pressureless sintering.

The pressureless sintering took place in a graphite resistance furnace at 1625° C. with a constant flow of a purge gas containing nitrogen through the heating chamber. The preform was held at 1625° C. for 50 minutes and then allowed to cool to room temperature. The resulting sintered disks were checked for density, the degree of closed porosity, and for toughness and hardness using the conventional Vickers Indentation Method with a 10 kg load. The results are reported in Table 1. The relationship between fracture toughness and silicon nitride concentration is illustrated in FIG. 1 for samples prepared by pressureless sintering with and without HIPing and samples prepared by hot pressing.

examples 1–5. The properties of the resulting sintered samples are presented in Table 3.

TABLE 3

Pressureless Sintered Results (Varying SiC$_w$ Content)

| Ex. | SiC$_w$ (Wt %) | Green Density (% TD) | Sintered Density (% TD) | Open Porosity (Vol %) | Closed Porosity (Vol %) |
|---|---|---|---|---|---|
| 11 | 10 | 65.2 | 98.1 | 0.05 | 1.85 |
| 12 | 15 | 64.9 | 95.9 | 0.08 | 4.02 |
| 13 | 20 | 66.8 | 94.2 | 0.57 | 5.23 |
| 14 | 25 | 67.5 | 88.8 | 0.58 | 10.62 |

EXAMPLE 15

Example 15 was made using the same technique as in examples 1–5 but without binder or lubricant. Example 12 had 15 wt % silicon carbide whiskers and 5 wt % silicon nitride. The sample was hot pressed under nitrogen at 1520° C. and a pressure of 4,000 psi. The resulting composite had the average properties listed in Table 4:

TABLE 4

| Density | >99% theoretical |
|---|---|
| Hardness (GPa) | 17.3 |
| Fracture toughness (MPa√m) | 5.0 |

The fracture toughness is shown in FIG. 1 for comparison against the samples sintered without supraatmospheric pres-

TABLE 1

Pressureless Sintered Results (Varying Si$_3$N$_4$ Content)

| Ex. | Si$_3$N$_4$ (Wt %) | SiC$_w$ (Wt %) | Green Density (%) | Sintered Density (%) | Open Porosity (vol. %) | Closed Porosity (vol. %) | Hardness (GPa) | Toughness (Mpa√m) |
|---|---|---|---|---|---|---|---|---|
| 1 | 1.0 | 15 | 62.5 | 98.8 | — | — | 17.4 | 5.3 |
| 2 | 2.5 | 15 | 64.8 | 95.5 | 0.04 | 4.46 | 15.3 | 5.8 |
| 3 | 5.0 | 15 | 64.9 | 95.9 | 0.08 | 4.02 | 15.5 | 6.0 |
| 4 | 7.5 | 15 | 65.4 | 96.1 | 0.26 | 3.64 | 15.6 | 6.0 |
| 5 | 10.0 | 15 | 60.0 | 94.9 | 0.37 | 4.73 | 16.0 | 5.6 |

Examples 1–5 were then subjected to hot isostatic pressing (HIPing) to make examples 6–10. The properties of the samples after HIPing are reported in Table 2.

TABLE 2

HIPed Results (Varying Si$_3$N$_4$ Content)

| Ex. | Si$_3$N$_4$ (Wt %) | SiC (Wt %) | Density (% TD) | Open Porosity (Vol %) | Closed Porosity (Vol %) | Hardness (GPa) | Toughness (MPa√m) |
|---|---|---|---|---|---|---|---|
| 6 | 1.0 | 15 | — | — | — | 19.0 | 4.9 |
| 7 | 2.5 | 15 | 98.5 | 0.13 | 1.37 | 16.7 | 5.6 |
| 8 | 5.0 | 15 | 98.4 | 0.16 | 1.44 | 17.3 | 5.4 |
| 9 | 7.5 | 15 | 98.6 | 0.13 | 1.27 | 17.5 | 5.4 |
| 10 | 10.0 | 15 | 96.5 | 0.87 | 2.63 | Sample Cracked | |

EXAMPLES 11–14

Examples 11–14 maintain the silicon nitride powder concentration at 5% and vary the whisker concentration. The preparation method is otherwise the same as that of sure according to the present invention. By comparison, a commercially available hot pressed sample with 15 wt % silicon whiskers and no silicon nitride had a better toughness of 5.6 MPa√m.

As will be seen from FIG. 1, samples prepared according to the present invention both with and without HIPing have a better toughness than the hot pressed sample of the same composition subjected to hot pressing. The toughness exhibited by samples of the present invention are also comparable to or better than the hot pressed sample without silicon nitride.

EXAMPLES 16–20

Metal-cutting tools in the form of inserts were prepared for comparison to commercially available inserts. The inserts of example 3, were pressureless sintered and then HIPed as in example 8 to produce a blanks having the shape of disks with a diameter of 1.125 inches (28.6 mm). The blanks were cut to the shape of inserts having the same dimensions and cutting surface preparations as conventional ceramic cutting tool inserts.

The inserts were prepared as identified in Table 5:

TABLE 5

| Example | Material |
|---------|----------|
| 16 | Commercially available insert of silicon carbide whisker reinforced alumina, 25 wt % whiskers made by hot pressing |
| 17 | Insert according to the invention of silicon carbide whisker reinforced alumina containing 5 wt % silicon nitride powder modifier and up to 2% of Mg and Y oxides as sintering aids, 15 wt % whiskers |
| 18 | Commercially available silicon nitride (Sialon) insert generally used in the industry for cutting iron |
| 19 | Commercially available zirconia reinforced alumina insert for cutting iron. |
| 20 | Commercially available tungsten carbide insert coated with alumina |

Tool life was determined by the first of: (a) fracture; (b) an average flank wear of 0.012 in. (0.30 mm) or greater; (c) a maximum flank wear of 0.017 in. (0.43 mm) or greater; (d) a maximum nose wear of 0.017 in. (0.43 mm) or greater; or (e) a notch wear of 0.79 in. (2 mm) or greater. Having established: such standardized wear ranges, the tool life can be used to compare the usefulness of each of the tested tool materials.

EXAMPLE 21

One insert each from examples 16–19 were tested for wear performance by turning nodular ductile iron (295 bnh) on a 60 HP Axis C.N.N. Universal Lathe; No coolant was used. The cutting speed was 900 surface feet per minute. (SFPM) (274 SMPM) at a feed rate of 0.015 inches per revolution (0.38 mm per revolution). Each cut was at a depth of 0.10 inches (2.54 mm). Table 6 reports the results.

TABLE 6

| Example | Average Wear (in.) | Maximum Wear (in.) | Nose Wear (in.) | Tool Life (min.) | Failure Mode |
|---------|--------|---------|---------|---------|---------|
| 16 | 0.0250 | 0.0573 | — | 3.75 | Fracture |
| 17 | 0.0125 | 0.0134 | 0.0132 | 4.50 | Wear |
| 18 | 0.0125 | 0.0140 | 0.0114 | 1.00 | Wear |
| 19 | 0.0091 | 0.0170 | 0.0085 | 1.00 | Wear |

EXAMPLE 22

The inserts of examples 16–20 were tested for wear performance by turning nodular ductile iron (295 bnh) on a 60 HP Axis C.N.N. Universal Lathe. No coolant was used. The cutting speed was slower than in Ex. 21, 700 SFPM v. 900 SFPM, at a feed rate of 0.015 inches per revolution (0.38 mm per revolution). Each cut was at a depth of 0.10 inches (2.54 mm). Table 7 reports the results.

TABLE 7

| Example | Average Wear (in.) | Maximum Wear (in.) | Nose Wear (in.) | Tool Life (min.) | Failure Mode |
|---------|--------|---------|---------|---------|---------|
| 16 | 0.0133 | 0.0151 | 0.0138 | 5.0 | Wear |
| 17 | 0.0122 | 0.0156 | 0.0109 | 3.5 | Wear |
| 18 | 0.0124 | 0.0138 | 0.0111 | 1.0 | Wear |
| 19 | 0.0085 | 0.0191 | 0.0042 | 1.0 | Wear |
| 20 | 0.0156 | 0.0270 | 0.0296 | 2.0 | Wear |

EXAMPLE 23

The inserts of examples 16–20 were tested for wear performance by turning G4000 Grey Iron (196 bnh) on a 60 HP Axis C.N.N. Universal Lathe. No coolant was used. The cutting speed was 1500 SFPM at a feed rate of 0.015 inches per revolution (0.38 mm pair revolution). Each cut was at a depth of 0.10 inches (2.54 mm). Table 8 reports the results.

TABLE 8

| Example | Average Wear (in.) | Maximum Wear (in.) | Nose Wear (in.) | Tool Life (min.) | Failure Mode |
|---------|--------|---------|---------|---------|---------|
| 16 | 0.0108 | 0.0173 | 0.0104 | 21 | Wear |
| 17 | 0.0096 | 0.0175 | 0.0137 | 21 | Wear |
| 18 | 0.0133 | 0.0174 | 0.0165 | 5 | Wear |
| 19 | 0.0111 | 0.0171 | 0.0163 | 17 | Wear |
| 20 | 0.0099 | 0.0170 | 0.0141 | 18 | Wear |

EXAMPLE 24

The inserts of examples 16–19 were tested for wear performance by turning Inconel 718 (432 bhn) on a 60 HP Axis C.N.N. Universal Lathe. Coolant was used. The cutting speed was 650 SFPM at a feed rate of 0.008 inches per revolution (0.20 mm per revolution). Each cut was at a depth of 0.06 inches (1.52 mm). Table 9 reports the results.

TABLE 9

| Example | Average Wear (in.) | Maximum Wear (in.) | Nose Wear (in.) | Tool Life (min.) | Failure Mode |
|---------|--------|---------|---------|---------|---------|
| 16 | 0.0126 | 0.0193 | 0.0275 | 4.0 | Wear |
| 17 | 0.0131 | 0.0171 | 0.0425 | 5.0 | Wear |
| 18 | 0.0173 | 0.0216 | 0.0569 | 1.0 | Wear |
| 19 | 0.0089 | 0.0113 | 0.1172 | 2.0 | Wear |

EXAMPLE 25

Inserts of Example 17 were ground to form a cutting edge. The inserts have been used successfully in the following operations:

a. Facing stainless steel 304 with a 0.0335 in depth of cut b. Turning O.D. of a round 4140 steel bar with a depth of cut varying from 0.015 to 0.025 in.

c. Turning O.D. of a round cold rolled 1020 steel bar.

The above were run dry (no lubricant) and exhibited excellent cutting efficiency at high rates of metal removal while exhibiting high wear resistance. An insert of Example 17 which had not been cutting-edge ground, performed similarly to the cutting edge ground insert when the test of Example 25(b) was repeated.

Example 17 inserts that had been edge ground also exhibited high cutting efficiencies and low wear rates when used to cut non-ferrous metals, including copper, brass and aluminum at high surface speeds.

EXAMPLE 26 — DRILL AND ROUTER BITS

Samples according to examples 3 were extruded in the form of continuous rods having nominal diameters of 0.25 inches (6.35 mm) and 0.5 inches (12.7 mm) for formation into drill and router bits, respectively. Samples of each diameter were cut into rods having a nominal 4 inch (10.2 cm) length. The rods were then HIPed in accordance with Example 8 and surface ground with conventional equipment to final precise diameters of 0.25 inches (6.35 mm) for the drill bit samples and 0.5 inches (12.7 mm) for the router bits. The finished samples had an average density of 98.1% of theoretical and all samples exhibited the conventional geometry and cutting edge preparations for each type of tool.

The whisker-reinforced drill bits made by the process of the invention were tested in a side-by-side comparison against conventional tungsten carbide drill bits having the same geometry and edge preparation for drilling holes in fiberglass laminates and carbon fiber laminates. The whisker-reinforced bits formed clean holes with no visible evidence of delamination.

The whisker-reinforced router bits made by the process of the invention were tested against a conventional tungsten carbide router bit for high speed (3,000–4,000 rpm) routing performance on wood, particle board, medium density fiberboard, plywood, and plastic laminate-covered plywood (i.e., Formica™. The router bits exhibited the same geometry and edge preparation.

In all cases, the whisker-reinforced router bit of the invention removed material rapidly with sharp, clean, uniform profiles. The samples shaped with the whisker-reinforced tools exhibited no burning of the shaped edge. The whisker-reinforced tools exhibited no adhesive buildup of resin from the shaped samples.

In contrast, samples shaped with the conventional tungsten carbide bit exhibited edge burn marks due to the friction at the cutting interface. The conventional tungsten carbide bits also exhibit adhesive buildup when cutting laminates such as plywood.

EXAMPLES 27–30

Examples 27 and 28 were prepared with a silicon nitride modifier concentration of 5% as in examples 1–5. The powdered blends were, however, ball milled for four hours longer, pressed at a higher pressure of 15,000 psi (10,350 N/cm$^2$), and sintered at a higher temperature of 1690° C. The purge gas consisted of nitrogen. Table 10 shows the improvements in sintered density that results even with a whisker content of over 20%.

TABLE 10

| Ex. | SiC$_w$ (Wt %) | Green Density (% TD) | Sintered Density (% TD) | Open Porosity (Vol %) | Closed Porosity (Vol %) |
|---|---|---|---|---|---|
| 13 | 20 | 66.6 | 94.2 | 0.57 | 5.23 |
| 27 | 20 | 68.0 | 96.1 | 0.25 | 4.65 |
| 28 | 22.5 | 68.0 | 95.6 | 0.22 | 4.48 |
| 14 | 25 | 67.5 | 88.8 | 0.58 | 10.62 |

Examples 27 and 28 were then HIPed. Certain properties of the HIPed composites are reported in Table 11.

TABLE 11

| Ex. | SiC (Wt %) | Sintered Density (% TD) | Open Porosity (Vol %) | Closed Porosity (Vol %) | Hardness (GPa) | Toughness (MPa√m) |
|---|---|---|---|---|---|---|
| 8 | 15 | 98.4 | 0.16 | 1.44 | 17.3 | 5.4 |
| 29 | 20 | 98.6 | 0.06 | 1.34 | 19.3 | 6.7 |
| 30 | 22.5 | 97.4 | 0.03 | 2.57 | 17.6 | 6.4 |

EXAMPLES 31–34

Examples 31 and 32 were prepared in accordance with the procedure of Examples 1–5 but with a purge gas containing 5 volume percent propane and 95 volume percent nitrogen. The purge gas flow rate was about 3 GHSV with a specific constant flow rate of about 2 liters per minute through a sintering chamber having a volume of about 40 liters. Table 12 lists certain physical properties of the resulting composite.

TABLE 12

| Ex. | SiC (Wt %) | Propane (vol %) | Sintered Density (% TD) | Open Porosity (Vol %) | Closed Porosity (Vol %) | Hardness (GPa) | Toughness (MPa√m) |
|---|---|---|---|---|---|---|---|
| 3 | 15 | 0 | 95.9 | 0.08 | 4.02 | 15.5 | 6.0 |
| 31 | 15 | 5 | 96.6 | 0.13 | 3.27 | 17.2 | 6.2 |
| 13 | 20 | 0 | 94.2 | 0.57 | 5.23 | * | * |
| 32 | 20 | 5 | 95.9 | 0.13 | 3.97 | 16.8 | 6.3 |

* - The sintered density is too low to permit reliable hardness and toughness measurement.

As Table 12 shows, a purge gas containing a hydrocarbon gas during the pressureless sintering process has at least two advantages. The first advantage is visible from photomicrographs of samples sintered with and without a hydrocarbon gas. A microporous boundary layer is visible from the micrographs to a depth of about 0.06 inches (1520 μm). The microporous region would have to be ground from the sample for optimum performance by the composite in high wear applications. The second advantage is an increase in hardness.

The sample pressureless sintered with a hydrocarbon in the purge gas does not exhibit a microporous layer of open pores. Micropores, to the extent they are visible in the photomicrographs, are fewer in number. The samples can be HIPed with an attendant increase in density thereby suggesting that the outer micropores exhibit a higher percentage of closed cell structures.

Examples 31 and 32 were HIPed to make examples 33 and 34, respectively. Table 13 lists certain of the physical properties after HIPing for composites pressureless sintered.

TABLE 13

| Ex. | SiC (Wt %) | Propane (vol %) | HIPed Density (% TD) | Open Porosity (Vol %) | Closed Porosity (Vol %) | Hardness (GPa) | Toughness (MPa√m) |
|---|---|---|---|---|---|---|---|
| 8 | 15 | 0 | 98.4 | 0.16 | 1.44 | 17.3 | 5.4 |
| 33 | 15 | 5 | 98.6 | 0.04 | 1.32 | 18.8 | 6.1 |
| 34 | 20 | 5 | 99.0 | 0.04 | 0.96 | 19.8 | 6.9 |

Table 13 shows that improvements in the HIPed samples are possible when the samples were first pressureless sintered with a purge stream containing a hydrocarbon gas. There is no significant loss of toughness upon HIPing as was observed when a hydrocarbon gas was not used. See, FIG. 1. Compare the toughness data for examples 3 (6.0 MPa √m) and 8 (5.4 MPa√m) with the same results from examples 31 (6.2 MPa√m) and 33 (6.1 MPa√m). Moreover, HIPing produced a harder sample when the pressureless sintering was conducted with a purge gas containing propane. Indeed, the toughness and hardness values of examples 33 and 34 are comparable to those obtained by hot pressed alumina-silicon carbide whisker composites.

It will be understood that the examples presented herein are for illustration purposes and are not intended to act as limitations on the scope of the appended claims.

We claim:

1. A process for making a sintered composite body comprising:
   sintering at ambient pressures a preform body having a density within the range from about 60% to about 70% of theoretical maximum and made from a mixture comprising: a matrix consisting essentially of alumina and up to about 4 wt % of sintering aids, about 10 to about 25 wt % of monocrystalline whiskers, and about 1 to about 7.5 wt % of nitride modifier consisting essentially of silicon nitride or aluminum nitride or mixtures thereof, to provide a sintered ceramic composite which exhibits a density of at least about 95% of theoretical and a sufficiently high density and concentration of closed pores to achieve a density of at least about 98% theoretical upon densification by hot isostatic pressing.

2. A process according to claim 1 wherein the sintering is conducted with a preform body having a nitride modifier consisting essentially of silicon nitride.

3. A process according to claim 1 wherein the sintering is conducted with a preform body having a whisker selected from the group consisting of alumina, titanium carbide, silicon carbide, titanium nitride, aluminum nitride, aluminum oxynitride, and mixtures thereof.

4. A process according to claim 1 wherein sintering is conducted with a preform body containing silicon carbide whiskers.

5. A process according to claim 1 wherein the sintering is conducted with a preform body having a silicon carbide whisker content within the range from about 10 wt % to about 20 wt % and having a silicon nitride modifier.

6. A process according to claim 4 wherein the sintering is conducted with a preform body having a silicon carbide whisker content of about 10–18 wt %.

7. A process according to claim 4 wherein the sintering is conducted with a preform body having a nitride modifier content within the range from about 2 wt % to about 7.5 wt %.

8. A process according to claim 4 wherein the sintering is conducted with a preform body having a nitride modifier content within the range from about 3.5. wt % to about 6 wt %.

9. The process according to claim 1 wherein the sintering is conducting with a nitrogenous-containing purge gas.

10. The process according to claim 1 wherein the sintering is conducted with a purge gas that contains a hydrocarbon.

11. A process according to claim 1 wherein the sintering is conducted with a preform body consisting essentially of a matrix consisting essentially of alumina, at least one sintering aid, silicon carbide whiskers, and silicon nitride.

12. A process according to claim 1 wherein the sintering is conducted with a preform body further containing a mixture of sintering aids.

13. A process according to claim 12 wherein the sintering is conducted with a preform body further containing magnesia and yttria as sintering aids.

14. A process according to claim 11 wherein the sintering is conducted with a purge gas that contains nitrogen.

15. A process according to claim 11 wherein the sintering is conducted with a purge that contains nitrogen and a hydrocarbon.

16. A process according to claim 1 further comprising before the sintering step:
    forming a preform body having a density within the range from about 60% to about 70% of theoretical by a process consisting essentially of thoroughly mixing said alumina, the sintering aids, said nitride modifier, and said whiskers to form a mixture that will loose less than about 2.5% by weight upon pressureless sintering.

17. A process according to claim 16 further comprising:
    shaping said preform body into a shape approximating a final shape with allowance for shrinkage of the shaped preform body upon sintering.

18. A process according to claim 17 further comprising:
    shaping said preform body into a drill bit, a router bit, a cutting tool, a turbine blade, an engine block, a piston, a valve, a punch, a die, a nozzle, a roller, a ball bearing, a roller bearing, an extrusion die, or a pump seal.

19. A process according to claim 1 further comprising:
    subjecting the sintered preform body to hot isostatic pressing to produce a compacted ceramic body having a density of at least about 98% of theoretical.

20. A composite comprising a sintered ceramic matrix consisting essentially of alumina and up to about 4 wt % of sintering aids, about 10 to about 25 wt % monocrystalline whiskers, and about 1 to about 7.5 wt % of nitride modifier consisting essentially of silicon nitride or aluminum nitride or mixtures thereof, wherein said sintered ceramic composite was formed by pressureless sintering and exhibits a density of at least about 95% of theoretical and a closed pore structure that will permit a further density increase to at least about 98% of theoretical by hot isostatic pressing.

21. A composite as in claim 20 which is further pressed by hot isostatic pressing.

22. A composite as in claim 20 wherein said whiskers are present within the, range from about 10 wt % to about 20 wt %.

23. A composite as in claim 20 wherein said whiskers are selected from the group consisting of alumina, titanium carbide, silicon carbide, titanium nitride, aluminum oxynitride, and mixtures thereof.

24. A composite as in claim 20 wherein said whiskers consist essentially of silicon carbide.

25. A composite as in claim 20 wherein said nitride modifier consists essentially of silicon nitride powder.

26. A composite as in claim 20 wherein said nitride modifier is present from about 2 to about 7.5 wt %.

27. A composite as in claim 20 wherein said sintering aids contain a mixture of magnesia and yttria.

28. A composite as in claim 20 wherein said at least one sintering aid comprises up to about 2 wt % of a mixture of yttria and magnesia.

29. A composite of claim 20 which exhibits the shape of a forming wheel, die, or punch.

30. A composite of claim 20 which exhibits the shape of a drill bit, router bit or cuing tool bit.

* * * * *